July 25, 1950 — J. M. NISSEN — 2,516,142
CONTROL MECHANISM AND STABILIZER
Filed March 21, 1947 — 2 Sheets-Sheet 1
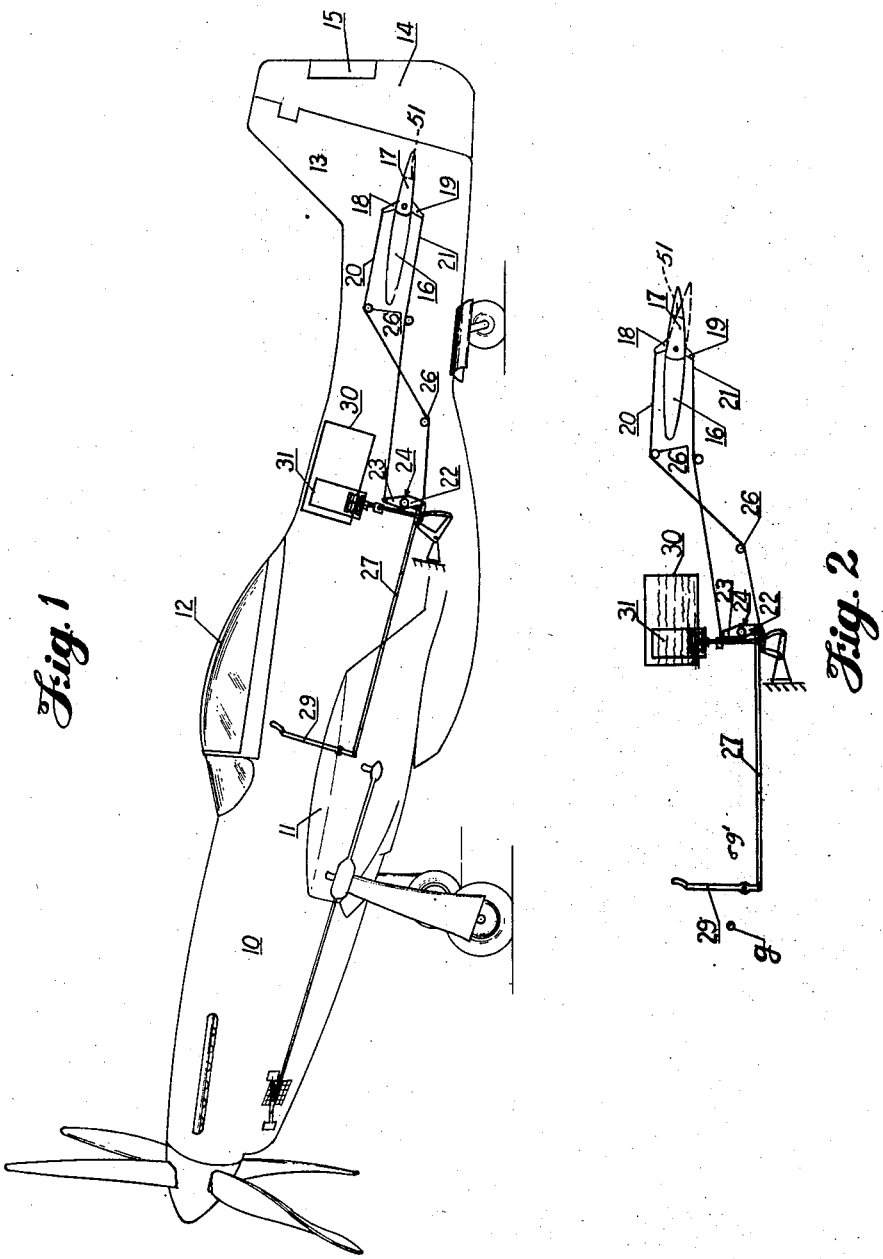
Inventor
JAMES M. NISSEN July 25, 1950 — J. M. NISSEN — 2,516,142

CONTROL MECHANISM AND STABILIZER

Filed March 21, 1947 — 2 Sheets-Sheet 2

Inventor
JAMES M. NISSEN

Patented July 25, 1950

2,516,142

UNITED STATES PATENT OFFICE 2,516,142

CONTROL MECHANISM AND STABILIZER

James M. Nissen, Los Altos, Calif.

Application March 21, 1947, Serial No. 736,192

4 Claims. (Cl. 244—76)

(Granted under the act of March 3, 1883, as amended April 30, 1928; 370 O. G. 757)

The present invention relates to new and useful improvements in aircraft, and more particularly to new and useful improvements in aircraft control mechanism and stability.

In aircraft, conditions of flight stability may vary with changing load conditions. Thus, as the load in an aircraft is changed, the center of gravity may also be changed to such an extent that stability of the aircraft may be substantially affected. While the invention is generally concerned with all flight stability, both stable and unstable, it is particularly concerned with conditions of longitudinal stability and maintenance of constant stick free static stability at the control stick. Many types of variable loads are contemplated but the invention is illustrated in connection with a fuel tank located in the fuselage and aft of the normal center of gravity of the aircraft. In certain types of aircraft, normal longitudinal stick-free stability occurs when the aft fuel tank is empty, but with a fully serviced tank, the center of gravity is shifted rearwardly with resultant conditions of longitudinal instability. Such conditions, if not corrected, require the exercise of excessive movements on the control stick to maintain the desired level flight.

With the above in mind, one of the principal objects of the present invention is to substantially maintain stick-free stability regardless of shifting positions of the center of gravity of the aircraft.

Another object of the invention is to substantially maintain stick-free stability during variations and shifting of loads in the aircraft.

Another object of the invention is to control and substantially maintain stability of an aircraft by automatically applying a force on the control surface according to shifting of the center of gravity of the aircraft in accordance with variations in load carried by the aircraft.

A further object of the invention is to provide means directly acted upon by the load for applying a force on the control surface to maintain stability of the aircraft.

Another object of the invention is to decrease the stick-free longitudinal stability of an airplane where the airplane is too stable due to the center of gravity being too far forward.

A still further object of the present invention is the provision of means for automatically adjusting the stick free longitudinal stability to a desirable value with center of gravity shift on an airplane possessing lower than desirable stability.

A still further object of the present invention is the provision of means for automatically making an unstable airplane stable.

The device illustrated is only one form of the invention. The device may consist of a solid weight and an arm which applies a force on the elevators. The position of the weight on the arm and, hence the load applied on the elevator, may be a function of the variable load.

The device may be used to maintain constant longitudinal stability by either increasing or decreasing the stability of the airplane with change in variable load.

The invention still further aims to provide a device directly responsive to the weight of the load for maintaining longitudinal stability of the aircraft.

The above and other objects of the invention will in part be obvious and will be hereinafter more fully pointed out.

In the accompanying drawings:

Fig. 1 is a diagrammatic side elevation of a grounded airplane with an aft fuel tank and showing the control mechanism for the elevators;

Fig. 2 is a schematic view of the control mechanism and serviced fuel tank in level flight;

Figure 5:
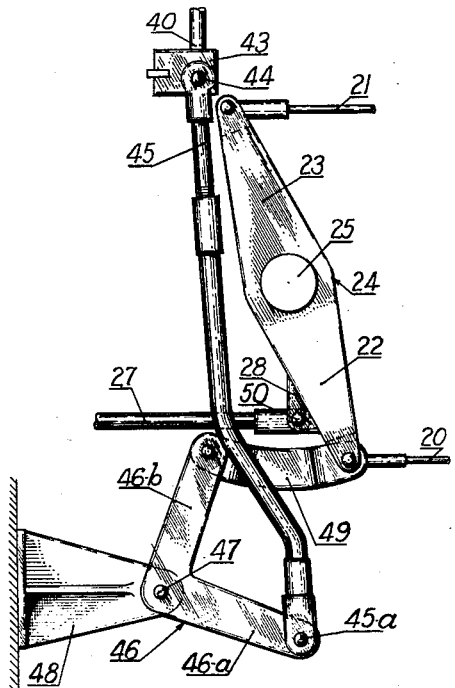
Fig. 5 is an enlarged detail side view showing the link and lever connection between the main and auxiliary control mechanism.
Figure 3:
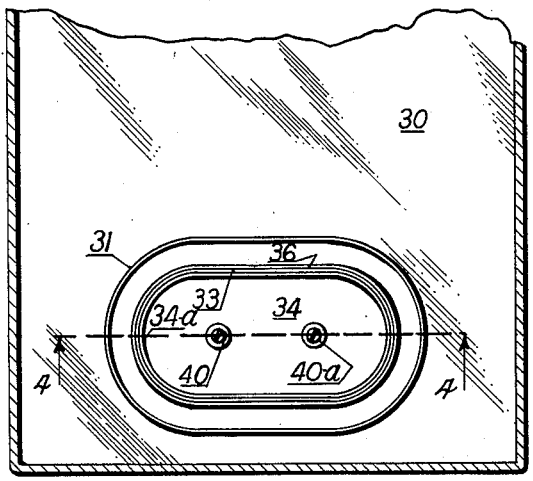
Fig. 3 is a fragmentary horizontal sectional view of the fuel tank.
Figure 6:
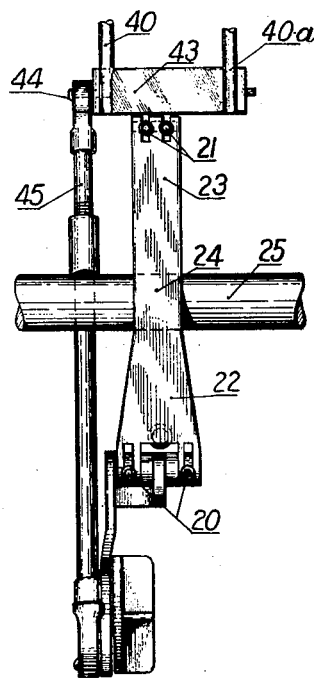
Fig. 6 is an end view of Fig. 5.
Figure 4:
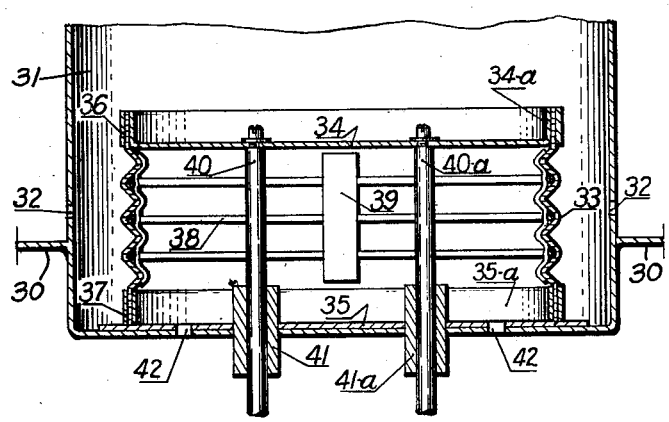
Fig. 4 is an enlarged section taken along the line 4—4 of Fig. 3.

Referring more in detail to the accompanying drawings, and particularly to Fig. 1 thereof, the invention is diagrammatically illustrated as applied to an airplane of a more or less conventional type, such as a low wing monoplane having a single seat and single engine. As illustrated, the airplane consists of a fuselage 10 having main wings 11 and a substantially centrally located blister type cockpit 12. The tail assembly includes a fin 13, a rudder 14 hingedly connected thereto and including a trim tab 15. The stabilizers 16 have elevators 17 hinged thereto and a trim tab 51. Top and bottom horns 18, 19, respectively, on the elevator are connected by cables 20, 21, respectively, to opposite arms 22, 23 of a control lever 24 mounted on a fixed pivot 25. The cables are suitably trained over idler pulleys 26. A control rod 27 is connected to an arm 28 depending from the lever 24 and to the pivoted control stick 29 for operating the elevators. Similar mechanism may be provided for operating the other control surfaces.

An auxiliary fuel tank 30 is carried in the fuselage in rear of the cockpit and rearwardly of the center of gravity which is normally located at g for stable level flight. With the particular type of airplane shown, it is stable with the fuel tank empty but with the tank fully serviced, the plane becomes relatively unstable, as the center of gravity is shifted rearwardly.

Under these conditions the airplane tends either to dive or climb, and will not return to a trim airspeed once the airplane has been displaced from the trim condition. Stability is obtained by use of the device as follows: for a given weight of fuel in the rear gas tank and at a given airspeed the elevator will be at a required angle for straight flight. The weight of the gas on the bellows will put a certain down load on the elevator. This force will be counteracted by a down deflection of the elevator tab so that the airplane is trimmed longitudinally. If the airspeed of the airplane is increased, the down load on the elevator, due to the weight of gasoline on the bellows, remains approximately constant but the up load on the elevator, due to the elevator tab, increases deflecting the elevator up, which noses the airplane up and thereby reduces the speed of the airplane to the trim speed. If the airspeed of the airplane is decreased from the trim airspeed then the down load on the elevator, due to the weight of gasoline on the bellows, becomes greater than the up load on the elevator, due to the elevator tab and the elevator is deflected downward. This noses the airplane down which increases the airspeed of the airplane to the original trim airspeed where the forces again balance. Thus, it is seen that the airplane exhibits static longitudinal stability.

The fuel tank 30 may be provided with an inner casing 31 open at the top adjacent the top surface of the tank and provided with apertures 32 near the bottom of the tank. This construction permits the fuel level within the casing to substantially correspond to the fuel level in the tank and also serves to reduce splashing and surging of the fuel within the inner casing. A bellows type piston is disposed in the inner casing for guided movement therein. The piston includes a circumferentially pleated rubber wall portion 33 which is secured between top and bottom header members 34, 35, respectively, each provided with upwardly extending annular flange portions 34a, 35a. The ends of the wall portion 33 are disposed around the flange portions 34a, 35a and secured thereto by clamping rings 36, 37. Wire rings 38 are arranged in the outward pleated portions of the wall portion 33 for strengthening and reenforcing purposes and are maintained in position by flexible strips 39 of rubber or other suitable flexible material. The bottom header 35 is secured to the bottom of the fuel tank and piston rods 40, 40a are secured to the top header 34. The piston rods 40, 40a extend through bearings 41, 41a, respectively, mounted in the bottom of the fuel tank which is also provided with vents 42 to the chamber provided within the wall portion 33. The spaced piston rods serve to guide the bellows in rectilinear movement.

The free ends of the piston rods are connected by a spacer 43 which is pivotally connected, as at 44, to an arm 45. The arm 45 is pivoted, as at 45a, to the arm 46a of a bell crank lever 46 which is pivotally mounted, as at 47, to a bracket 48. The other arm 46b of the bell crank is pivotally connected to a link 49 which in turn is pivoted to the end of lever arm 22. The opposite lever arm 23 is pivotally connected to the cable 21 which is connected to the bottom elevator horn. The lower end of the lever arm 22 is pivotally connected to the cable 20 which in turn is connected to the top elevator horn. The control rod 27 from the control stick is pivotally connected, as at 50, to the arm 28 for effecting movement of the lever 24 about the pivot 25. Thus, a rearward pull on the control stick will effect clockwise movement of the lever 24 and a pull on the cable 20 connected to the top horn 18, so that the elevators will be moved upwardly. Similarly, a forward push on the control stick will effect counterclockwise movement of the lever 24 and a pull on the cable 21 connected to the bottom horn 19, so that the elevators will be moved downwardly.

In the particular installation, normal stick-free stability occurs when the auxiliary fuel tank 30 is empty. The wall portion 33 of the piston is constructed so as to offer little or no resistance to movement of the elevator controls, and during flight, the pressures on the elevators will tend to maintain them in their required position with the piston wall 33 extended somewhat upwardly in the inner casing. Thus, when the tank is empty, substantially no disrupting forces are exerted on the elevator controls so that the airplane remains longitudinally stable. However, when the tank 30 is serviced and full of fuel, the weight of the column of fuel within the inner casing tends to force the piston downwardly to collapse the wall portion 33. And too, the fully serviced tank tends to shift the center of gravity rearwardly to the point g' and this causes the airplane to nose up when a given setting of the elevator trim tab or adjustable stabilizer is maintained during flight. However, the downward movement of the piston rods 40, 40a operates through the arm 45 to rotate the bell crank 46 in a clockwise direction and the lever 24 in a counter-clockwise direction so as to exert a pull on the cable 20 which will shift the elevators slightly downwardly to counteract the tendency of the airplane to nose up. As the fuel is used and the level thereof reduced, the weight on the piston is lessened so that the airflow on the elevators will tend to move the same upwardly and thus cause the piston to move upwardly as the center of gravity moves forwardly to the position of normal longitudinal stability. The weight of the fuel on the piston is proportional to the fuel level so that the force on the control stick is such as to maintain constant stability thereof at its various positions during longitudinally stable flight according to the positions of the elevators. The rubber wall portion 33 of the piston is formed so as to offer substantially no resistance to its being extended when the tank is empty and the airplane is in normal longitudinal stability. With such an arrangement, substantially no resistance is offered to the downward movement of the piston under the influence of the weight of the fuel in the inner casing.

From the foregoing description, it will be seen that an extremely simple, yet efficient mechanism is provided for maintaining the elevators or other control surfaces at positions such that stability of an aircraft, particularly longitudinal stability thereof, in flight, will be maintained regardless of the shifting positions of the center of gravity as a load, such as an auxiliary fuel tank, carried by the aircraft varies during flight. The weight of the load acts on the piston or other weight responsive device suitable for the purpose. Thus, the control stick is shifted to positions corresponding to positions of the elevators but is maintained in stick-free static stability in all such positions by the influence of the piston controlled mechanism on the main control system. Of course, such influence is assisted by the action of the airstream on the elevators and the elevator trim tab or adjustable stabilizer or other control surfaces and the pressure within the fuel tank.

While one form of the invention has been shown for purposes of illustration, it is to be clearly understood that various changes in the details of construction, arrangement of parts and operation thereof may be changed without departing from the spirit and scope of the invention contemplated and as set forth in the appended claims.

The invention described herein may be manufactured and used by or for the Government of the United States of America for governmental purposes without the payment of any royalties thereon or therefor.

What I claim is:

1. In aircraft having a tendency toward longitudinal instability in flight caused by a shifting of the center of gravity thereof as a result of variations in the weight of a load carried thereby at a point removed from the normal center of gravity, the combination of elevator control surfaces, operating mechanism for said control surfaces, a fuel tank located aft of the center of gravity of the aircraft, a piston located in said tank and constructed and arranged to be moved in response to fuel level in said tank, and connections between said piston and said operating mechanism for shifting said operating mechanism and said control surfaces according to the variations of fuel level in said tank whereby to maintain normal longitudinal stability in flight regardless of shifting of the center of gravity of the aircraft.

2. In aircraft having a fuel tank located aft of the normal center of gravity of the aircraft which fuel tank when filled shifts the center of gravity rearwardly to cause longitudinal instability in flight, the combination of elevator control surfaces, operating mechanism for said control surfaces, a device located in said fuel tank and movable in response to variation in the fuel level therein, and linkage means connecting said device to said operating mechanism for shifting said control surfaces through said operating mechanism to positions compensating for the changing positions of the center of gravity whereby to maintain longitudinal stability of the aircraft in flight.

3. In aircraft having a fuel tank located aft of the normal center of gravity of the aircraft which fuel tank when filled shifts the center of gravity rearwardly to cause longitudinal instability in flight, the combination of elevator control surfaces, an inner tubular casing within said fuel tank and apertured to permit the fuel level of the tank to be present therein, piston means movable axially in said casing in response to the fuel level in said tank, a piston rod connected to said piston means and extending exteriorly of said tank, a link connected to said piston rod, and bell crank lever means connected to said link and to said control surfaces for effecting movement of said control surfaces in response to variation in the fuel level in said tank whereby to compensate for changing positions of the center of gravity of the aircraft.

4. In aircraft having a fuel tank located aft of the normal center of gravity of the aircraft which fuel tank when filled shifts the center of gravity rearwardly to cause longitudinal instability in flight, the combination of elevator control surfaces, an inner tubular casing within said fuel tank and apertured to permit the fuel level of the tank to be present therein, a bellows piston having the interior thereof open to pressure in the aircraft and movable axially in said casing in response to the fuel level in said tank, a piston rod connected to said bellows piston and extending exteriorly of said tank, a link connected to said piston rod, and bell crank lever means connected to said link and to said control surfaces for effecting movement of said control surfaces in response to variation in the fuel level in said tank whereby to compensate for changing positions of the center of gravity of the aircraft.

JAMES M. NISSEN.

REFERENCES CITED

The following references are of record in the file of this patent:

UNITED STATES PATENTS

| Number | Name | Date |
| --- | --- | --- |
| 1,857,849 | Hojnowski | May 10, 1932 |
| 1,956,755 | Constantin | May 1, 1934 |
| 2,002,740 | Hojnowski | May 28, 1935 |
| 2,104,006 | Ballou | Jan. 4, 1938 |